United States Patent [19]

Sharp et al.

[11] 3,845,671

[45] Nov. 5, 1974

[54] FULL TIME SLIP CONTROLLED FOUR WHEEL DRIVE

[75] Inventors: Ellis Alvin Sharp, New Orleans, La.; Courtney F. Dolan, Syracuse, N.Y.

[73] Assignee: Chrysler Corporation, Highland Park, Mich.

[22] Filed: Feb. 12, 1973

[21] Appl. No.: 331,456

[52] U.S. Cl. .................... 74/710.5, 74/711
[51] Int. Cl. ............................... F16h 1/44
[58] Field of Search ............. 74/710.5, 711, 713; 192/103 R, 103 F; 180/44 R, 49

[56] References Cited
UNITED STATES PATENTS

| | | | |
|---|---|---|---|
| 2,228,581 | 1/1941 | Olen | 74/710.5 |
| 2,234,890 | 3/1941 | Brousseau | 74/710.5 |
| 3,138,970 | 6/1964 | Costa et al. | 74/711 |
| 3,498,154 | 3/1970 | Muller-Berner | 74/710.5 |
| 3,752,284 | 8/1973 | Brittain et al. | 192/103 F |

FOREIGN PATENTS OR APPLICATIONS

| | | | |
|---|---|---|---|
| 1,210,687 | 2/1966 | Germany | 192/103 R |

Primary Examiner—Samuel Scott
Assistant Examiner—P. S. Lall
Attorney, Agent, or Firm—Talburtt & Baldwin

[57] ABSTRACT

Four wheel drive train including a transfer case adapted to provide full time four wheel drive. A differential is provided in the transfer case which is electronically controlled to be locked up to prevent differentiation when the slip between the input and output shafts exceed a predetermined tolerance.

4 Claims, 3 Drawing Figures

FULL TIME SLIP CONTROLLED FOUR WHEEL DRIVE

BACKGROUND OF THE INVENTION

This invention relates to transfer cases for four wheel drive systems, and more particularly to a full time four wheel drive transfer case.

Four wheel drive systems have been in existence for many decades. The output of the engine was split between the front wheels and the rear wheels by a transfer case. One type of system used for many years provided undifferentiated power to all wheels of the vehicle. This gave the vehicle good mobility under adverse surface conditions. However, this type of drive was not particularly useful for normal highway driving. Since all four wheels operated at the same speed the vehicle could not be turned without sliding or scuffing one or more tires. This drawback resulted in the development of systems which included a conventional two wheel drive mechanism. For highway use, the two wheel drive was utilized and this caused the vehicle to assume the characteristics of most other two wheel vehicles.

It is desirable in a four wheel drive vehicle to obtain the benefits of differentiation provided in conventional two wheel drive vehicles while also obtaining the benefits of a conventional four wheel drive, when desired. This invention is directed to a transfer case adapted to provide such characteristics.

SUMMARY OF THE INVENTION

Briefly, this invention comprises a transfer case adapted to provide a full time four wheel drive with automatic differentiation of the drive to the front and rear axles within a predetermined speed range.

A primary object of this invention is to provide a transfer case of the class described which utilizes a differential adapted to be automatically locked up within a predetermined speed or range to render the transfer case capable of providing a non-differentiating drive to the front and rear wheel sets.

Another object of this invention is to provide a transfer case such as described in which the rear output shaft is on the same centerline as the input shaft, thereby eliminating the need for an offset rear axle. The power flow through the front train is thus one-half the torque relieving this train of excessive stress.

A further object of this invention is to provide a transfer case of the class described which is economical in construction and efficient in operation.

Other objects and advantages will be made apparent as the description progresses.

DESCRIPTION OF THE DRAWINGS

In the accompanying drawings, in which one of various possible embodiments is illustrated.

Like parts are indicated by corresponding reference characters throughout the several views of the drawings.

DESCRIPTION OF THE PREFERRED EMBODIMENT

Figure 2:
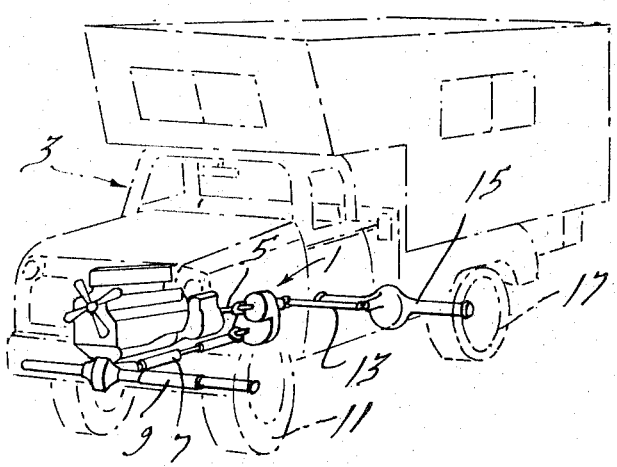
FIG. 2 is a diagrammatic view of the application of the transfer case and system shown in FIG. 1 to a truck.

Referring now to the drawings, a transfer case constructed in accordance with the invention is generally indicated at 1. The transfer case 1 is more particularly described in U.S. patent application filed by C. F. Dolan on Nov. 30, 1972 U.S. Ser. No. 311,045 entitled "Full Time Four Wheel Drive" and assigned to a common assignee. As shown in FIG. 2, the transfer case may be utilized in the drive train of a truck vehicle 3. The transmission output shaft 5 is connected to the transfer case 1 which feeds the power through a propshaft 7 to the axle 9, the front wheels 11 and through a propshaft 13 to the axle 15 for the rear wheels 17.

The transfer case 1 includes a housing 19 formed in three sections 21, 23 and 25 suitably interconnected by a plurality of fasteners 27. An input shaft 29 is rotatably mounted in one wall 31 of the housing 19 by a bearing 33. The shaft 29 has an input low gear 35 formed integrally therewith which meshes with a larger gear 37 forming one gear of a gear cluster 39 rotatably journaled by bearing means 41 on a shaft 43 extending between the one wall 31 and a wall 45 of section 21. An annular lubricant trough or slinger 46 is provided on a gear 37 adjacent the teeth thereof. The purpose of trough or slinger 46 will be made apparent hereinafter. Bearing means 41 includes a first set 47 of roller bearings separated from a second set 49 of roller bearings by an annular spacer 51. The second set 49 is separated from a third set 53 of bearings by a narrow annular spacer 55.

A second gear 57 of the gear cluster 39 is spaced from the gear 37 by a neck 59 having a plurality of radially extending lubricating ports 61 therein for facilitating the flow of lubricant to and from the bearing means 41. The second gear 57 is smaller than the gear 37 and is in constant mesh with a gear 63 rotatably mounted on an elongated shaft 65 by a bushing 66. The second gear 57 is also provided with a lubricating or slinger trough 58 and the gear teeth of the gear 57 are slightly wider than the teeth of the gear 63 for a purpose to be made apparent hereinafter.

The end of shaft 65 has a bore 67 therein in which the end 69 of shaft 29 is piloted. Bearings 71 rotatably support the shaft 29. Clutching teeth 73 are formed on the outer periphery of the shaft 65 and a clutch 75 surrounds and meshes with such teeth. The clutch 75 has a groove or recess 77 therein which receives an actuating yoke (not shown) for shifting the clutch to the right or left as viewed in FIG. 1. The input shaft 29 is provided with clutching teeth 79 at its inner end adjacent the low gear 35. Troughs or ports, the bottoms of which are curved, are provided at 81 between the teeth 79.

The gear 63 is also provided with a set of clutching teeth 83 on the collar 84 thereof adjacent the teeth 73. As will be understood, the clutch 75 may be moved to the left as viewed in FIG. 1 to couple the input shaft 29 directly to the shaft 65 or moved to the right to couple the gear 63 to the shaft 65. The gear 63 is constantly driven by the input shaft 29 through the gear reduction set comprising a plurality of gears 35, 37 and 57.

The shaft 65 is supported by the bearings 83 in a plate 85 mounted in the wall 45 and a wall 87 of section 23 and extends rearwardly through section 23 and section 25. A collar 89 is splined at 91 to the shaft 65 and has a plurality of pinion shafts 93 connected thereto and extending radially therefrom. The pinion shafts 93 are secured at their outer ends in a carrier 95 of a differential unit 97 formed of two separate parts 99 and 101 and joined together by fasteners 103.

Pinions 105 are rotatably supported by the pinion shafts 93 on bearing sets and spacers 190 and 191, respectively, and are in mesh with two side gears 107 and 109, one of which has a tubular extension 111 and the other of which is formed on the end of an output shaft 113. The side gear 107 and its extension 111 are rotatably mounted on the shaft 65 by a plurality of sets 115 of bearings separated by spacers 117.

Mounted on extension 111 by a spline connection 119 is a sprocket 121. This sprocket is connected by a chain 123 to a front wheel drive sprocket 125 rotatably mounted by bearings 127 and 129 in section 23 of the three-part housing. The shaft 131 of sprocket 125 is spline connected to a yoke 133 which is adapted to be connected to the forwardly extending propshaft 7. A suitable seal is provided at 135.

The output shaft 113 is rotatably mounted by bearings 137 in the rearward end of section 25 of the housing 19. A collar 139 is splined at 141 to the shaft 113 and has a speedometer thread 143 thereon.

The speedometer thread 143 is located in a chamber 145 formed in section 25. Chamber 145 is adapted to be supplied with lubricant through pie-shaped openings 147 in wall 149. A breather fitting, not shown, is located on the outer wall of chamber 145 to permit operation with temperature and pressure variations.

A wall 149 is provided in section 25 and includes a hub 151 through which the output shaft 113 extends. The opening through the hub 151 has two portions, the first of which surrounds a lubricant feeding thread portion 153 of the shaft 113. The lubricant feeding portion 153 has a thread 155 thereon for feeding lubricant from the chamber 145 through the first portion of the opening in the hub 151 toward the differential 97. A second portion of the opening in the hub 151 surrounds bearings 157 which rotatably support the output shaft 113. Radially extending lubricant ports or passages 159 are provided therein. A port 159 is located at the inward end of the lubricant feeding thread 155 and directs the oil to the bore 163. A seal 192 behind the bearing 157 prevents oil passage directly to the bearing 157. The passage 159 extends radially inwardly to a bore 163 formed in the side gear 109 and output shaft 113. A first counterbore is provided at 165 and a second counterbore is provided at 167 in the side gear 109 and output shaft 113. The counterbore 165 pilots the right-hand end of the shaft 65 as viewed in FIG. 1. Bearings 169 rotatably support the end of the shaft 65 in the counterbore 167.

An elongated passage 171 extends from one end of the shaft 65 to the other, placing the bore 67 in communication with the bore 163. Radial ports 159, 173 and 195 extend from the passage 171 to the bearings 157, 115 and 169 respectively. As will be made apparent hereinafter, the various passages in the shafts provide for lubrication of the movable components of the transfer case.

The annular carrier 95, and particularly part 99 thereof, is provided with a set of annular internal clutch teeth 174 located outwardly of the side gear 107. The clutch hub 175 is splined at 177 to the extension 111 of the side gear 107. The hub 175 has a set of external clutch teeth 179 adapted to be moved into meshing engagement with the clutch teeth 174. The clutch is moved to the right by means of a solenoid 200 operating a yoke 202 extending into an annular groove or recess 181 in the hub. It will be seen that when the teeth 179 are moved into meshing engagement with the teeth 174 the carrier 95 is secured for rotation with the sprocket 121 through the hub 175 and extension 111.

The output shaft 113 is connected by a yoke 189 to the rearwardly extending propshaft 13, thus providing a drive to the rear axle 15 and rear wheels 17.

The solenoid 200 is mounted in an elongated cylindrical housing formed in the section 25. At the end of the housing, there is a concentric smaller cylindrical bore 204 extending through the end wall of the housing providing an annular stop ring 205 for locating and holding the solenoid. The opposite end of the housing is enclosed by an electrically insulating terminal board 206 having a pair of terminals 207 and 208 thereon. The terminal board 206 is retained by means of a retaining ring 210 pressing the terminal board 206 against an O-ring seal 212. A compression spring 214 biases the solenoid against the stop ring 205. The armature 216 of the solenoid is biased outward of the solenoid by means of a spring 218 enclosed in a flexible boot 220 keeping the solenoid area relatively clean from lubricants and dirt.

The yoke 202 is mounted to an elongated lockout rail 222 which is connected at one end to the armature 216. The other end of the rail 222 is slidably supported in a bore 224 in the section 23. Intermediate the ends of the rail 222 and extending through the wall of the section 23 is a threaded shift limiter 226 cooperating with a detent 228 on the rail to limit the movement of the clutch into engagement with the differential unit 97.

The solenoid 200 is controlled through an electronic network from a pair of timing wheels 230 and 232. The first or input timing wheel 230 is mounted on the periphery of the part 101 of the differentiating unit 97. The second or output timing wheel is mounted on the output side gear 109 and rotates therewith. A dual electro magnetic sensor unit 234 having a first and second pick up 236 and 238 respectively is positioned in the outside wall of the section 25 and is responsive to the rotation of the two timing wheels 230 and 232 for generating an electrical signal.

The input timing wheel 230 in addition to establishing a reference signal indicating the speed of rotation of the input shaft by means of an input counting means 240 also generates a signal through a timing means 242 and a logic network 244 for inhibiting lockout of the differential 97 beyond a predetermined vehicle speed range.

The output timing wheel 232 establishes through a second counting means 246 an electrical signal indicating the rotational speed of the output shaft 113 of the transfer case 1. This signal is compared with the reference signal of the input counter in the logic box 248 to determine whether or not there is excessive slip between the input and output shafts. If there is excessive slip then the solenoid drive 250 is activated to energize the solenoid 200.

Figure 3:
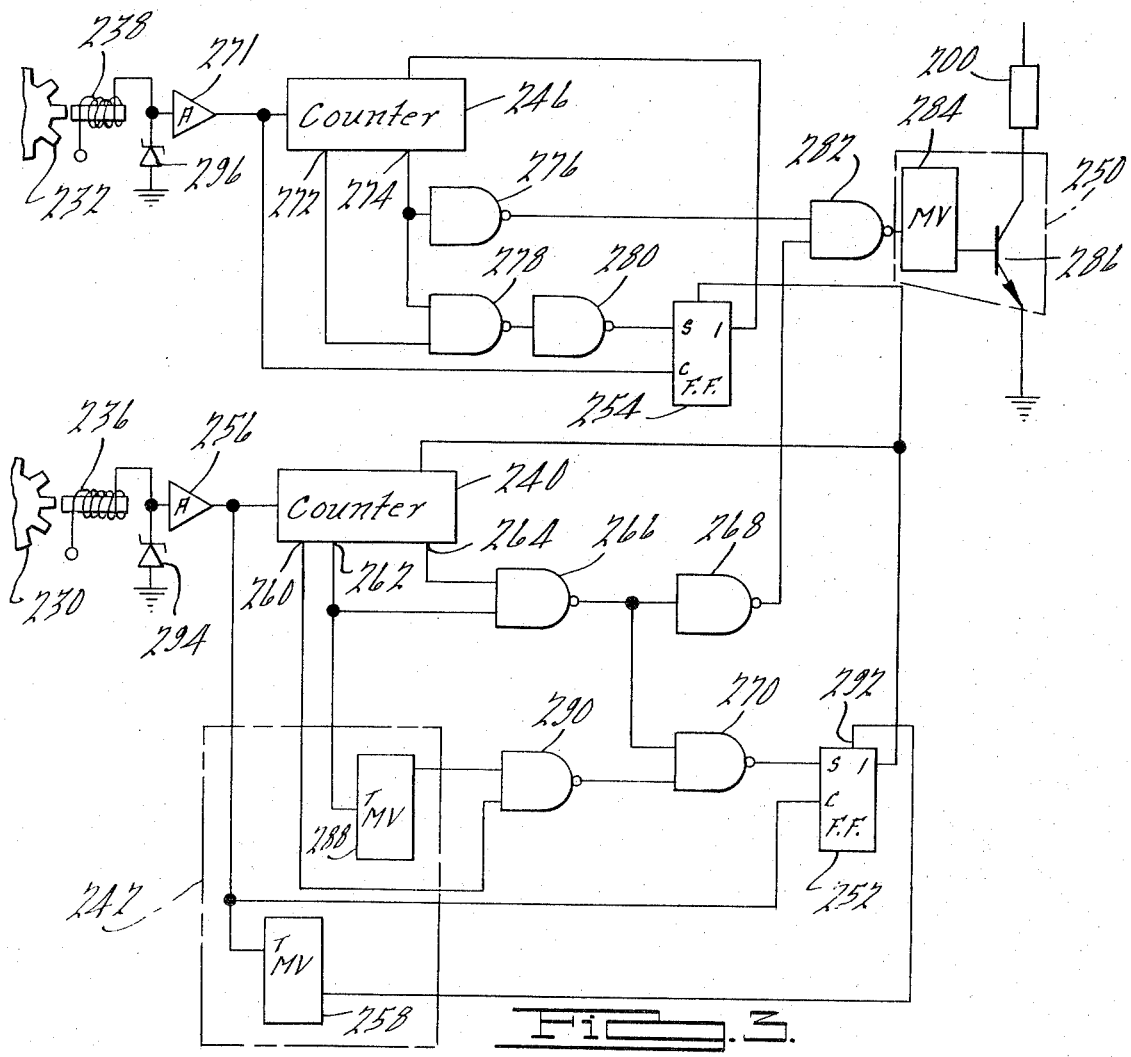
FIG. 3 is a schematic drawing of the control system illustrated in FIG. 1.

Referring to FIG. 3, there is illustrated in schematic form, the logic necessary to accomplish the objects of the invention in the preferred embodiment. The data used is for illustration purposes only and different data values may be used without departing from the spirit and scope of the invention.

In the preferred embodiment, both of the counters 240 and 246 are seven stage binary counters and the logic employed is positive level NAND logic. The two flip flops 252 and 254 are each clocked by signals from their respective sensors 236 and 238 supplied to the clocking input thereof. A positive signal on the set input coupled with a clocking signal will set the flip flop such that the output will go positive. The signal line entering the flip flop symbol on the top line thereof, is a predominate set signal which will cause the flip flop to set regardless of the signals present on the other inputs. The function of each flip flop is to reset its corresponding counter to zero and, in addition, the input flip flop 252 resets the output flip flop 254 thereby resetting the output counter 246.

The approach to the system is to measure the relative rotational speed of the input shaft 65 and the output shaft 113 and if there is a difference in the speeds, determine whether or not the difference is excessive or exceeds predetermined limits. Additionally, the logic provides means to only activate the control system within a predetermined speed range.

The input shaft timing wheel 230 is sensed by the magnetic pick up sensor 236 which generates an electrical signal to an amplifier 256. The output of the amplifier 256 which is a pulse, is electrically supplied to the input counter 240, the triggering input to a low speed control multivibrator 258 and the clocking input to the input flip flop 252. As previously indicated the counter is a binary counter and the outputs illustrated are the four 260, eight 262 and sixty-four 264 counts. The eight and sixty-four counts are combined in the NAND gate 266, the output of which is normally high or positive and at a count of seventy-two switches to low or negative. The next NAND gate 268 is electrically connected to receive this seventy-two count signal and functions as an inverter providing a sampling pulse to the logic from the rear shaft counter 240. As will be shown if this signal appears in a "window" formed by the output counter 246 and its associated gating, the relative speeds of the two shafts 65 and 113 within the desired slip range and the differential 97 is not locked up.

The seventy-two signal from the NAND gate 266 is supplied through another NAND gate 270 to set the input flip flop 252 which resets the input counter 240 and through the output flip flop 254 the output counter 246. This reset function takes place on the seventy-third pulse from the timing wheel 230.

The output shaft timing wheel 232 and pick-up 238 operating through the amplifier 271, in a similar manner as the input timing wheel 230, generates a pulse train to the output counter 246 and a clocking signal to the output flip flop 254. The output counter 246 is substantially identical to the input counter 240 and in the preferred embodiment has outputs 272 and 274 from the sixteen and sixty-four count stage respectively. The sixty-four output 274 is supplied to a pair of NAND gates 276 and 278 wherein the first NAND gate 276 functions as an inverter for supplying the opening of the "window." The second NAND gate 278 receives both counter outputs 272 and 274 and generates a signal to close the "window." The "window" is closed at a count of eight at which time the output of the NAND gate 278 is supplied through another NAND gate 280 to set the output flip flop 254 on the next pulse from the timing wheel. Thus, the output counter will always reset on the eighty-first pulse if not previously reset by the operation of the input flip flop 252.

The last NAND gate 282 performs the function of determining whether or not the relative rotational speeds of the input shaft 65 and the output shaft 113 are within the allowable slip tolerance as defined by the "window" set up by the output counter 246 and associated gating and the sampling pulse set up by the input counter 240. If the output of the NAND gate 282 is true or high, the slip is within tolerance and the solenoid drive circuit 250 including the multivibrator 284 and the control transistor 286 is not energized. If the slip is greater than the tolerance, the multivibrator 284 is energized for supplying a pulse of a predetermined time length to the control transistor 286 to energize the solenoid 200. In addition, the multivibrator generates a reset pulse, not shown, to reset the counters 240 and 246.

Figure 1:
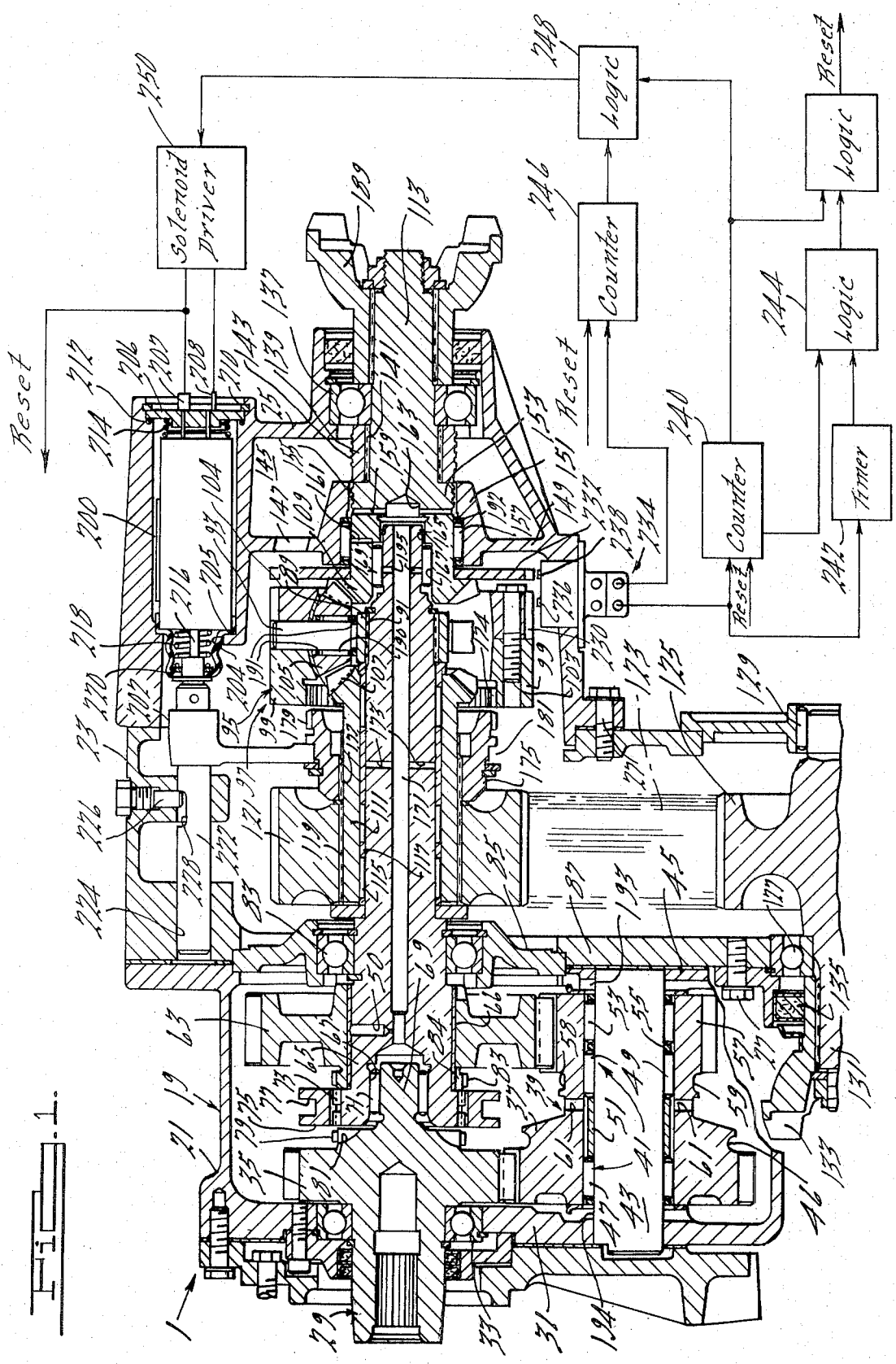
FIG. 1 is a diagrammatic system diagram with a partial section taken through a transfer case constructed in accordance with this invention.

When the solenoid 200 is energized, the yoke 202 is moved to the right in FIG. 1 meshing the gear teeth 179 and 174. This, as previously indicated, locks up the differential 97 and the input shaft 65 and the output shaft 113 rotate together. Once the clutch 175 is in mesh with the differential 97, it will remain in mesh until the relative torque between the two shafts has been substantially reduced.

An additional feature of the electronic control unit is to control the above described lock-up of the differential 97 within a predefined speed range. This is accomplished by means of two multivibrators 258 and 288 and a NAND gate 290. The one multivibrator 258 is a resettable multivibrator in that each time a pulse is applied to its triggering input, the timing of the multivibrator is restarted. Thus, for a low speed check, the multivibrator will time out if there are no pulses for a predefined time. In the preferred embodiment, the multivibrator has a time of eleven milliseconds which corresponds to a shaft rotation of approximately 90 hz. When the multivibrator 258 times out, its signal is applied to the dominate set input 292 of the input flip flop 252 causing both counters to reset preventing formation of the "window" and sampling pulse.

The high speed check is performed by means of the other multivibrator 288 and the NAND gate 290. This multivibrator is set by the eighth count pulse from the counter 240, and will remain set for predefined time such as 4.5 milliseconds. This signal is supplied to the NAND gate 290 and if the fourth count pulse from the counter 240 occurs while the counter is high, the output from the NAND gate 290 will set the input flip flop 252 to reset the counters 240 and 246 again preventing the formation of the "window" and sampling pulse.

Additionally, there is illustrated a pair of zener diodes 294 and 296 connected to the input to the amplifiers 256 and 271 to provide high voltage transient protection such as may be found at high rotational speeds.

The degree or percentage of slip allowed between the input shaft 65 and the output shaft 113 is defined by the number of counts from the opening of the "window" by the output counter 246 until the sensing pulse by the input counter 240. And, if the system is symmetrical, the closing of the "window" will occur at the same number of pulses after the sensing pulse. In the system described, the number of counts is eight and seventy-two respectively thereby the slip is 11%.

There has thus been shown and described an electronic four wheel drive differential slip control system for use in full-time four wheel drive vehicles.

What is claimed is:

1. In a transfer case for power drive systems having a housing, an input shaft, a rear wheel output shaft and a front wheel output shaft rotatably mounted in said housing, a differential carrier, means connecting said input shaft to said differential carrier in a driving relationship, a pinion carried by said differential carrier, first and second side gears in mesh with said pinion on opposite sides thereof to permit rotation of said side gears at different speeds, said means for connecting said input shaft to said differential carrier includes a first drive gear connected to said input shaft, a gear cluster having a second drive gear in constant mesh with said first drive gear and a third drive gear, a fourth drive gear, an intermediate shaft mounting said fourth drive gear for rotation relative thereto, said third drive gear being in constant mesh with said fourth drive gear, means connecting said intermediate shaft to said differential carrier, clutch means movable to three positions in one of which said first drive gear is coupled directly to said intermediate shaft, in a second of which said fourth drive gear is coupled to said intermediate shaft and in a third of which said input shaft is not drivingly connected to said intermediate shaft, bearing means rotatably supporting said input shaft in said intermediate shaft, and lubricating means on said cluster gear for supplying lubricant to said bearing means when said clutch means is in said second and third positions, means drivingly connecting said first side gear to said front wheel output shaft, said second side gear being connected to said rear wheel output shaft, locking means drivingly connected to one of said side gears adapted to be moved between a first position out of engagement with said differential carrier and in which said differential carrier may rotate relative to said side gears and a second position in engagement with said differential carrier for locking it to said one side gear for locking said differential carrier, pinions and side gears together, an input sensor coupled to said input shaft and responsive to the rotation thereof for generating a plurality of electrical signals, an input counter responsive to said electrical signals from said input sensor for developing a sampling signal at a predetermined count, an output sensor coupled to said output shaft and responsive to the rotation thereof for generating a plurality of electrical signals, an output counter responsive to said electrical signals from output sensor for developing a range signal between a pair of predetermined count values, a logic comparison network comprising a plurality of interconnected NAND gates for comparing said sampling signal and said range signal and generating a control signal when said sampling signal occurs in the absence of said range signal, and a solenoid connected to said locking means and responsive to said control signal to move said locking means to said second position.

2. A transfer case as set forth in claim 1 further including a speed control network comprising a multivibrator responsive to said input sensor for generating a first counter reset signal when the interval between adjacent signals from said first sensor is greater than the period of said multivibrator, a second multivibrator responsive to said input counter for generating an output signal having a predetermined period and a NAND gate electrically connected to said second multivibrator for comparing said output signal with a predetermined count of said input counter to generate a second count reset signal when said count and said output signal are coincident whereby said first counter reset signal indicates said input shaft is rotating slower than a predetermined speed and said second counter reset signal indicating said input shaft is rotating faster than a second predetermined speed.

3. In a power drive system comprising an input shaft, a pair of output shafts, a differential including a carrier and side gears, said side gears being coupled to said input and output shafts, a first toothed timing wheel connected to said differential for rotation therewith, a second toothed timing wheel connected to said rear wheel side gear member for rotation therewith, a first electro magnetic sensing means responsive to the relative rotation of the teeth on said first timing wheel thereby for generating a first electrical signal, a second electro magnetic sensing means responsive to the relative rotation of the teeth on said second timing wheel thereby for generating a second electrical signal, and control means including an actuating device, a locking member and a logic network responsive to said first and second electrical signals for generating an electrical control signal actuating said device for moving said locking member locking out said differential when the relative rotation between said timing wheels exceeds a predetermined value, said differential carrier having a set of teeth formed annularly thereon, said locking member comprising a hub, said hub having an annular set of clutching teeth thereon, said hub being movable toward and away from said differential carrier, to move said clutch teeth into and out of engagement with the teeth on said differential carrier, one side gear having a tubular extension thereon, means drivingly connecting said first side gear to one of said output shafts including said tubular extension, a sprocket splined to said tubular extension, said locking means including splines connecting said hub to said tubular extension, waid teeth on said differential carrier and said hub being adapted to be engaged upon movement of said hub in one direction to connect said differential carrier to said tubular extension.

4. In a transfer case for power drive systems having a housing, an input shaft, a rear wheel output shaft and a front wheel output shaft rotatably mounted in said housing, a differential carrier, means connecting said input shaft to said carrier in a driving relationship, a first side gear drivingly connected to said front wheel output shaft, and a second side gear connected to said rear wheel output shaft, said means for connecting said input shaft to said differential carrier includes a first drive gear connected to said input shaft, a gear cluster having a second drive gear in constant mesh with said first drive gear and a third drive gear, a fourth drive gear, an intermediate shaft mounting said fourth drive gear for rotation relative thereto, said third drive gear being in constant mesh with said fourth drive gear, means connecting said intermediate shaft to said differential carrier, clutch means movable to three positions in one of which said first drive gear is coupled directly to said intermediate shaft, in a second of which said fourth drive gear is coupled to said intermediate shaft and in a third of which said input shaft is not drivingly connected to said intermediate shaft, bearing means rotatably supporting said input shaft in said intermediate shaft, and lubricating means on said cluster gear for supplying lubricant to said bearing means when said clutch means is in said second and third positions, and means normally permitting said side gears to rotate relative to one another when the difference in rotational speeds thereof is below a predetermined difference and operative for drivingly connecting said side gear when the difference in rotational speeds is a predetermined difference.

* * * * *